United States Patent
Anderson et al.

(10) Patent No.: US 9,469,290 B2
(45) Date of Patent: Oct. 18, 2016

(54) POWER/ECONOMY MODE CONTROL SYSTEM FOR AN AGRICULTURAL VEHICLE

(71) Applicant: CNH Industrial America LLC, New Holland, PA (US)

(72) Inventors: Bruce E. Anderson, Lancaster, PA (US); Jeffrey D. Frego, Willow Street, PA (US); Edmund N. Holt, II, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/421,908

(22) PCT Filed: Aug. 16, 2013

(86) PCT No.: PCT/US2013/055398
§ 371 (c)(1),
(2) Date: Feb. 16, 2015

(87) PCT Pub. No.: WO2014/028863
PCT Pub. Date: Feb. 20, 2014

(65) Prior Publication Data
US 2015/0210263 A1    Jul. 30, 2015

Related U.S. Application Data

(60) Provisional application No. 61/742,686, filed on Aug. 16, 2012.

(51) Int. Cl.
*B60W 10/06* (2006.01)
*G06F 7/70* (2006.01)
(Continued)

(52) U.S. Cl.
CPC .......... *B60W 10/06* (2013.01); *A01D 41/1274* (2013.01); *B60W 10/101* (2013.01); *G06F 7/70* (2013.01); *B60W 2300/152* (2013.01); *B60W 2300/158* (2013.01); *B60W 2710/06* (2013.01); *B60W 2710/10* (2013.01)

(58) Field of Classification Search
None
See application file for complete search history.

(56) References Cited

U.S. PATENT DOCUMENTS

| 3,795,107 A | 3/1974 | Ward |
| 4,606,313 A | 8/1986 | Izumi et al. |

(Continued)

FOREIGN PATENT DOCUMENTS

| DE | 4111921 A1 | 10/1992 |
| EP | 1455119 A2 | 9/2004 |

*Primary Examiner* — Justin Holmes
(74) *Attorney, Agent, or Firm* — Patrick M. Sheldrake

(57) ABSTRACT

An agricultural vehicle includes a chassis and an engine, transmission and operator station which are each carried by the chassis. The engine has a maximum operating speed. The transmission includes a continuously variable output. A power/economy switch which is positioned within the operator station provides a first output signal indicative of a power mode and a second output signal indicative of an economy mode. A controller is coupled with each of the engine, the transmission and the power/economy switch. The controller receives the second output signal from the power/economy switch and controls each of the engine and the transmission to be in an economy mode, whereby an operating speed of the engine is limited to a reduced maximum speed which is below the maximum operating speed, and the continuously variable output of the transmission is increased to offset for the reduction in engine operating speed.

6 Claims, 3 Drawing Sheets

(51) Int. Cl.
*A01D 41/127* (2006.01)
*B60W 10/101* (2012.01)

(56) References Cited

U.S. PATENT DOCUMENTS

| | | | |
|---|---|---|---|
| 5,050,456 A | 9/1991 | Fukuda | |
| 5,335,750 A | 8/1994 | Geringer et al. | |
| 5,984,034 A * | 11/1999 | Morisawa | B60K 6/48 180/65.28 |
| 6,044,318 A | 3/2000 | Bourdon et al. | |
| 6,359,403 B1 | 3/2002 | Pollklas et al. | |
| 6,865,870 B2 | 3/2005 | Heisey | |
| 6,953,416 B2 | 10/2005 | Mende et al. | |
| 7,200,980 B2 | 4/2007 | Kempf | |
| 7,865,288 B2 | 1/2011 | Fukushima et al. | |
| 7,900,739 B2 * | 3/2011 | Bulgrien | F02D 31/001 123/349 |
| 8,554,428 B2 * | 10/2013 | Hubbard | B60W 10/06 701/51 |

\* cited by examiner

POWER/ECONOMY MODE CONTROL SYSTEM FOR AN AGRICULTURAL VEHICLE

This application is the US National Stage filing of International Application Serial No. PCT/US2013/055398 filed on Aug. 16, 2013 which claims priority to U.S. Provisional Patent Application No. 61/742,686 filed Aug. 16, 2012, each of which is hereby incorporated by reference in its entirety.

BACKGROUND OF THE INVENTION

1. Field of the Invention

The present invention relates to agricultural vehicles such as combines, and, more particularly, to methods of speed and power control under various operating conditions of such agricultural vehicles.

2. Description of the Related Art

An agricultural vehicle known as a harvester "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

With the increase in diesel fuel costs, operators are continually looking for ways to control input costs and thereby increase profits. For those operators with field locations which are spread out over great distances, transporting the combine between worksites (i.e., fields) can constitute a measurable amount of fuel consumption. Unless harvesting, a combine is not producing any return on investment for the owner, so being able to reduce the fuel costs associated with transport can provide a reduction in the overall input costs.

Accordingly, what is needed in the art is a work vehicle which can be transported between worksites at a reduced fuel consumption rate without sacrificing the top end ground speed.

SUMMARY OF THE INVENTION

The present invention provides an agricultural vehicle with a selectable power/economy mode for road transport, whereby the engine is operated to save fuel when in the economy mode without sacrificing the top end ground speed.

The invention in one form is directed to an agricultural vehicle, including a chassis and an engine, transmission and operator station which are each carried by the chassis. The engine has a maximum operating speed. The transmission includes a continuously variable output. A power/economy switch which is positioned within the operator station provides a first output signal indicative of a power mode and a second output signal indicative of an economy mode. A controller is coupled with each of the engine, the transmission and the power/economy switch. The controller receives the second output signal from the power/economy switch and controls each of the engine and the transmission for operation in an economy mode, whereby an operating speed of the engine is limited to a reduced maximum speed which is below the maximum operating speed, and the continuously variable output of the transmission is increased to offset for the reduction in engine operating speed.

The invention in another form is directed to a method of operating a work vehicle. The work vehicle has an engine with a maximum operating speed, and a transmission with a continuously variable output. The method includes the steps of:

selectively actuating a power/economy switch corresponding to a power mode or an economy mode, the power/economy switch providing a first output signal indicative of the power mode and a second output signal indicative of the economy mode; and controlling an engine and a transmission to be in the power mode or the economy mode, based on the selected mode of the power/economy switch, whereby:

a) when said power/economy switch is in the power mode, said engine is operable up to a maximum operating speed; and
b) when said power/economy switch is in the economy mode, an operating speed of the engine is limited to a reduced maximum speed which is below the maximum operating speed, and the continuously variable output of the transmission is increased to offset for the reduction in engine operating speed.

An advantage of the present invention is that the work vehicle can be operated in a manner which saves fuel for road transport, without negatively affecting the top end ground speed during transport.

Another advantage is that the power/economy mode of operation can be combined with a road/field mode switch so that the economy mode of operation only occurs when the vehicle is also in the road mode of operation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
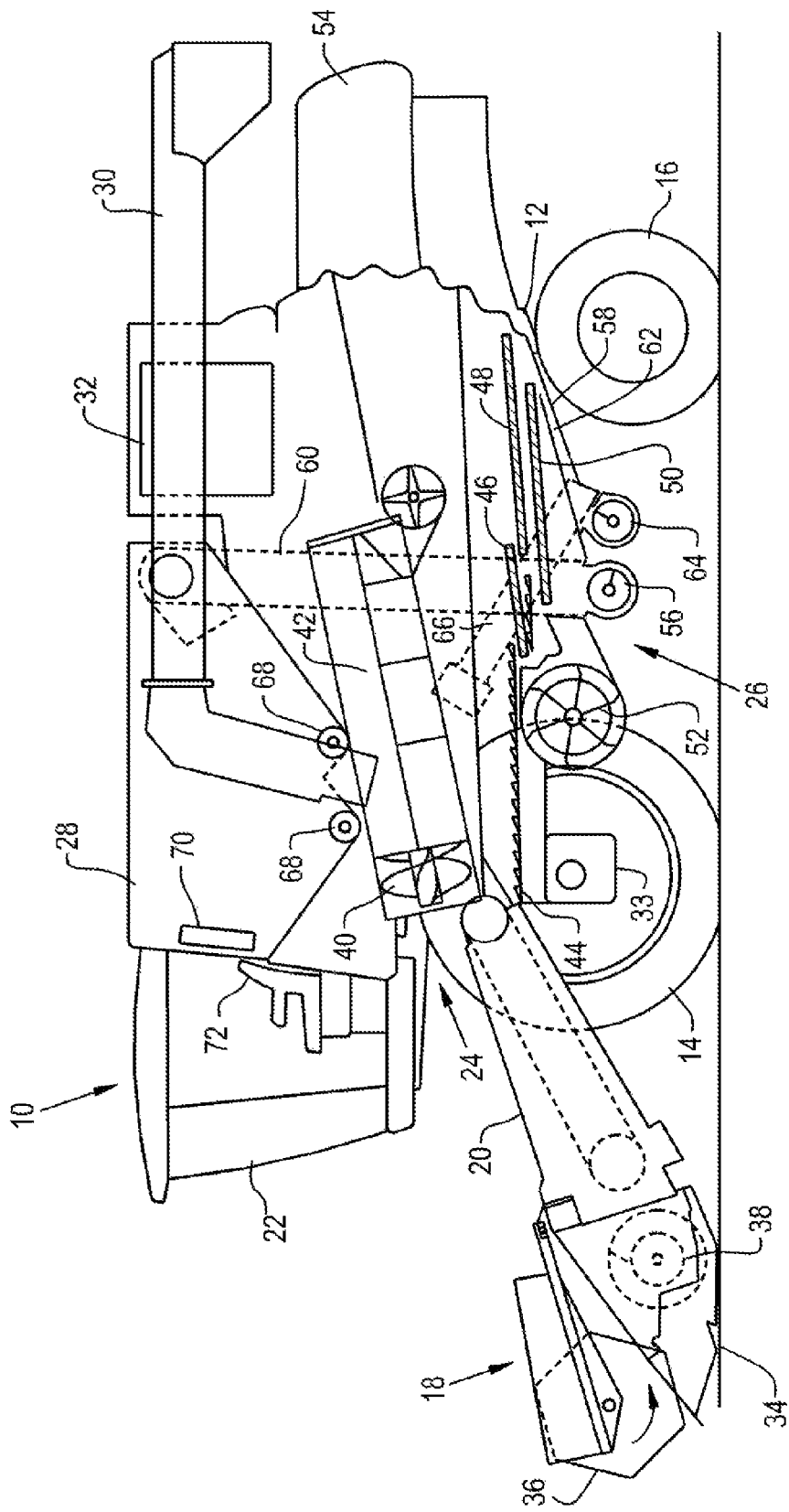
FIG. 1 is a side view of an embodiment of an agricultural harvester in the form of a combine which may include a power/economy mode control system of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, an operator station with a cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a continuously variable output transmission 33 driven by engine 32. The interconnecting mechanical drive between engine 32 and transmission 33 is not shown for simplicity sake, and the size and placement of transmission 33 can vary from the illustrated embodiment. In the illustrated embodiment, transmission 33 is a variable displacement hydrostatic transmission. Although combine 10 is shown as including wheels 14, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Combine 10 also includes one or more onboard electrical controllers 70 which control various functions onboard combine 10. Combine 10 is shown with a single controller 70 positioned at the rear of cab 22; however, the number and placement of the controllers can vary depending on the particularly configured combine. Controller 70 receives input signals corresponding to various operator selected functions, and then controls various mechanical components onboard combine 10 corresponding to the operator selected functions.

Figure 2:
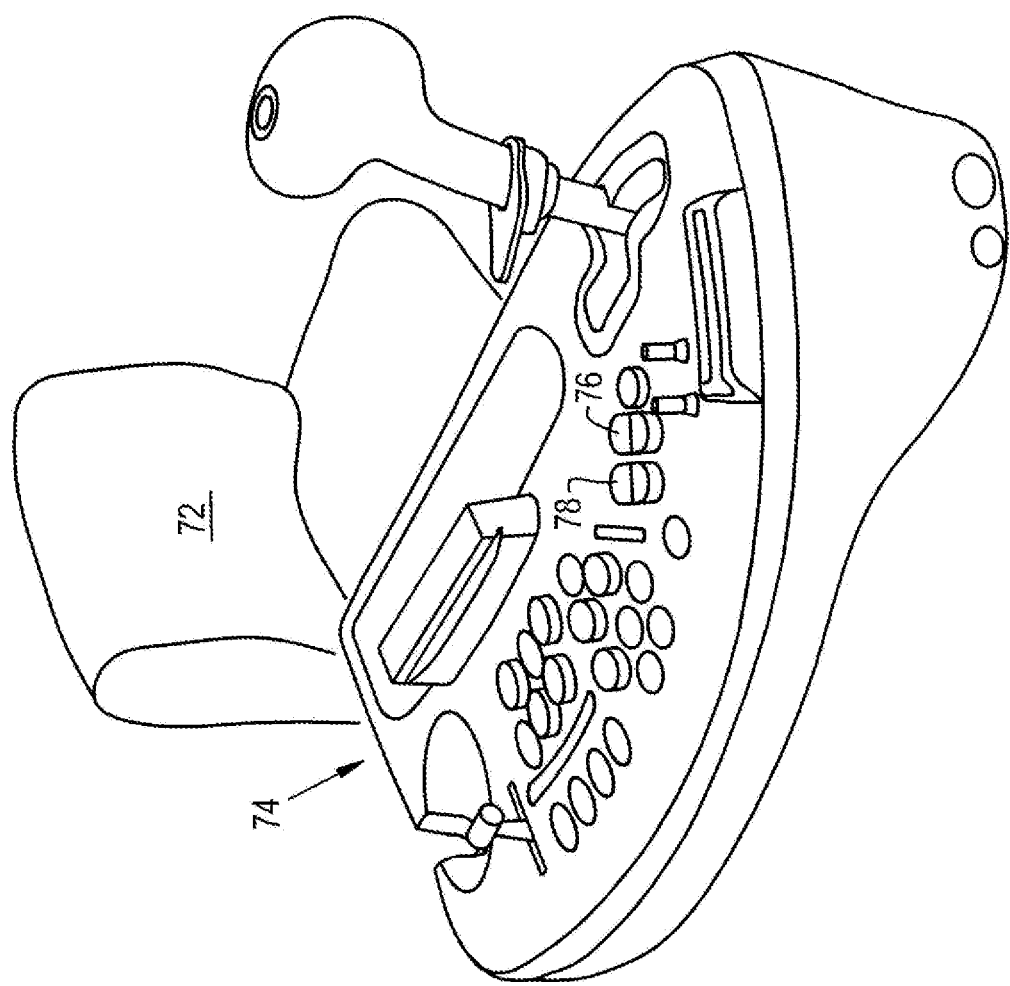
FIG. 2 is a perspective view of the seat and console contained in the cab of the combine of FIG. 1.
Figure 3:
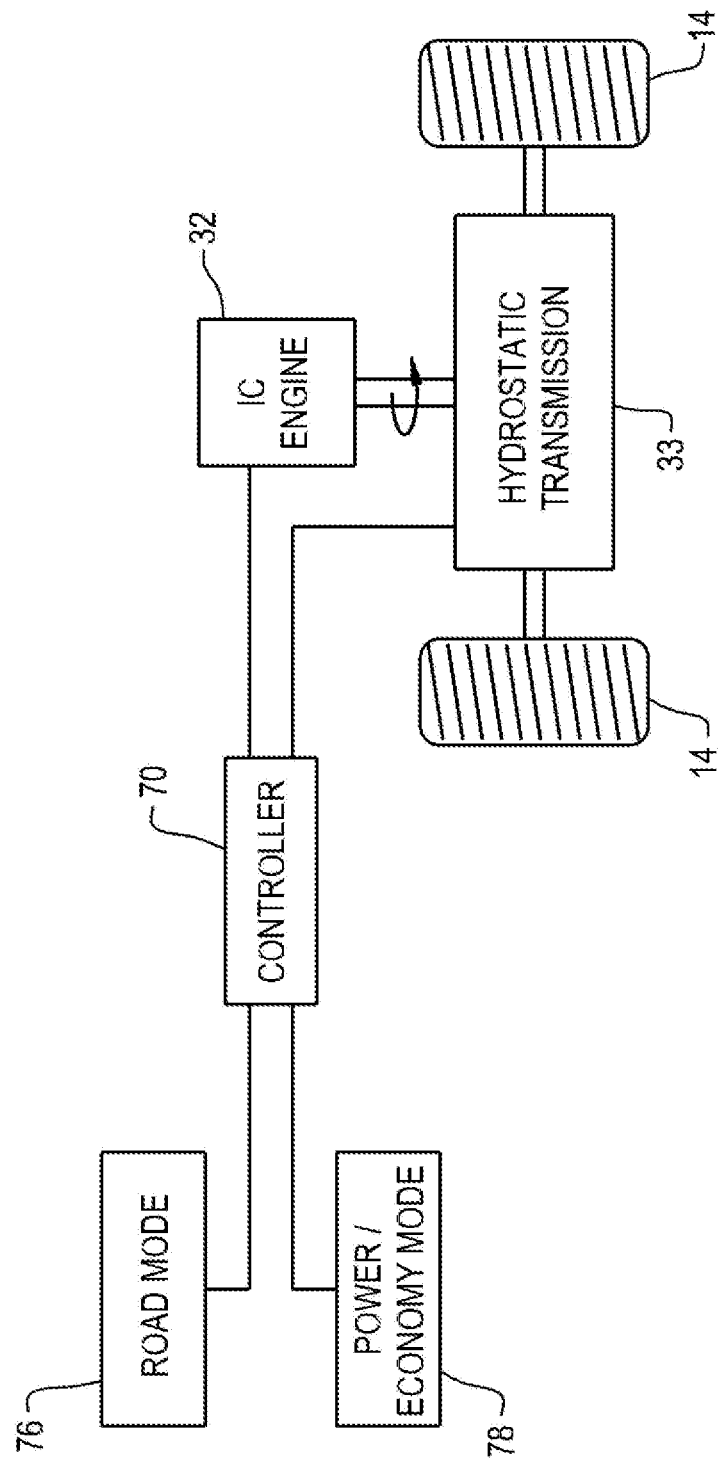
FIG. 3 is a schematic view of an embodiment of the power/economy mode control system of the present invention.

Referring now to FIGS. 1 and 2, conjunctively, an operator seat 72 is also positioned within the operator cab 22. An operator console 74 is positioned adjacent to seat 72 and includes various switches for an operator to select desired functions for operation of combine 10.

According to an aspect of the present invention, combine 10 includes a power/economy mode control system which functions to conserve power (and thus fuel) when combine 10 is traveling down the road between work sites, such as fields. Two of the switches on console 74 include a "road mode" switch 76 and a "power/economy mode" switch 78. Road mode switch 76 has a field position and a road position, and provides a road mode output signal when in the road position. Road mode switch 76 functions to interlock (i.e., lock out the functionality of) various mechanical components onboard combine 10. For example, when road mode switch 76 is in the road position, header 18 is locked in a raised position, unloading auger 30 cannot be swung out laterally to the unloading position, etc. In the illustrated embodiment, road mode switch 76 is a rocker switch, but could be any other suitable type of switch, such as a toggle switch, virtual switch on a visual display, etc.

Power/economy mode switch 78 has a power position and an economy position. Power/economy switch 78 provides a first output signal when in the power position indicative of a power mode of operation, and a second output signal when in the economy position indicative of an economy mode of operation. In the illustrated embodiment, power/economy switch 78 is a rocker switch, but could be any other suitable type of switch, such as a toggle switch, virtual switch on a visual display, etc.

In a preferred embodiment, power/economy mode switch 78 is only functional when the road switch 76 is in the road position. In other words, the default mode of operation is the "power mode", and unless road switch 76 is in the road position, then actuation of power/economy mode switch 78 does not result in any functional change of operation. That is, the combine will remain in the "power mode" if power/economy switch 78 is in the economy position but the road mode switch is in the field position.

During operation of combine 10, controller 70 is coupled with each of engine 32, transmission 33, road mode switch 76 and power/economy mode switch 78. When controller 70 receives the second output signal from power/economy switch 78, and also receives the road mode output signal from road mode switch 76, then controller 70 controls each of engine 32 and transmission 33 to be in an economy mode of operation. More particularly, the operating speed of engine 32 is limited to a reduced maximum speed which is below a maximum operating speed of engine 32. In one embodiment, the engine speed may be reduced between 10% to 20% of the maximum engine operating speed. For a typical farm tractor operating at a maximum operating speed of approximately 2400 RPM, the engine speed is reduced between 240 to 480 RPM. Moreover, the continuously variable output of transmission 33 is increased to offset for the reduction in engine operating speed. Depending on the configuration of the hydrostatic transmission, the continuously variable output of transmission 33 can be increased in different ways.

For most transport operating conditions, combine 10 will still have adequate torque when traversing over slightly hilly terrain, etc. with a reduced engine operating speed. However, for some transport conditions, such as particularly hilly terrain, or when combine 10 might be towing another implement such as a biomass cart or wagon, it may be desirable to operate combine 10 in the power mode of operation during transport. Power/economy switch 78 thus provides an operator with a choice between saving fuel or obtaining the maximum gradability and hydrostatic braking effects.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
    a chassis;
    an engine carried by said chassis, said engine having a maximum operating speed;
    a transmission carried by said chassis, said transmission including a continuously variable output;
    an operator station carried by said chassis;
    an input for selecting between a power mode and an economy mode, said power/economy input providing a first output signal indicative of a power mode and a second output signal indicative of an economy mode; and
    a controller coupled with each of said engine, said transmission and said power/economy input, said controller receiving said second output signal from said power/economy input and controlling each of said engine and said transmission to be in an economy mode, whereby an operating speed of said engine is limited to a reduced maximum speed which is below said maximum operating speed, and said continuously variable output of said transmission is increased to offset for the reduction in engine operating speed
    a road mode input configured for providing a road mode output signal to the controller, and wherein said controller controls each of said engine and said transmission to be in said economy mode when said controller receives both of said second output signal and said road mode output signal wherein road mode functions as an interlock for mechanical functions on the agricultural vehicle when actuated.

2. The agricultural vehicle of claim 1, further including an operator console positioned within said operator cab, and wherein each of said power/economy input and said road mode input are positioned on said console.

3. The agricultural vehicle of claim 1, wherein said transmission is a variable displacement hydrostatic transmission.

4. A method of operating a work vehicle, the work vehicle having an engine with a maximum operating speed, and a transmission with a continuously variable output, said method comprising the steps of:

selectively actuating a power/economy input for selecting a power mode or an economy mode, said power/economy input providing a first output signal indicative of the power mode and a second output signal indicative of the economy mode; and controlling an engine and a transmission to be in the power mode or the economy mode, based on the selected mode from the power/economy input, whereby:

a) when in the power mode, said engine can operate up to a maximum operating speed; and b) when in the economy mode, an operating speed of said engine is limited to a reduced maximum speed which is below said maximum operating speed, and said continuously variable output of said transmission is increased to offset for the reduction in engine operating speed selecting with a road mode input a road mode of the work vehicle, wherein the road mode interlocks mechanical functions on the work vehicle; and controlling each of said engine and said transmission to be in said economy mode when said controller receives the second output signal and said work vehicle is in said road mode.

5. The method of claim 4, further including the step of:
wherein the road mode input is a road mode switch corresponding to a road mode or a field mode, said road mode switch providing a road mode output signal indicative of the road mode and a field mode output signal indicative of the field mode.

6. An agricultural vehicle, comprising:
a chassis;
an engine carried by said chassis, said engine having a maximum operating speed;
a transmission carried by said chassis, said transmission including a continuously variable output;
an operator station carried by said chassis;
a power/economy switch positioned within said operator station, said power/economy switch providing a first output signal indicative of a power mode and a second output signal indicative of an economy mode; and
a controller coupled with each of said engine, said transmission and said power/economy switch, said controller receiving said second output signal from said power/economy switch and controlling each of said engine and said transmission to be in an economy mode, whereby an operating speed of said engine is limited to a reduced maximum speed which is below said maximum operating speed, and said continuously variable output of said transmission is increased to offset for the reduction in engine operating speed
a road mode switch providing a road mode output signal, and wherein said controller controls each of said engine and said transmission to be in said economy mode when said controller receives both of said second output signal and said road mode output signal, wherein said road mode switch functions as an interlock for a number of mechanical functions on the agricultural vehicle when actuated.

* * * * *